United States Patent [19]

Gay et al.

[11] Patent Number: 5,129,498
[45] Date of Patent: Jul. 14, 1992

[54] CLUTCH MECHANISM, ESPECIALLY FOR AN AUTOMOBILE VEHICLE

[75] Inventors: Christian Gay; Guido Rivolta, both of Amiens, France

[73] Assignee: Valeo, Paris, France

[21] Appl. No.: 601,438

[22] Filed: Oct. 23, 1990

[30] Foreign Application Priority Data

Oct. 27, 1989 [FR] France ................... 89 14126

[51] Int. Cl.⁵ ..................................... F16D 13/72
[52] U.S. Cl. ........................... 192/70.27; 192/89 B; 192/113 A
[58] Field of Search ............ 192/89 B, 113 A, 70.27

[56] References Cited

U.S. PATENT DOCUMENTS

| | | | |
|---|---|---|---|
| 4,084,674 | 4/1978 | de Gennes | 192/89 B |
| 4,657,128 | 4/1987 | Fujito et al. | 192/113 A |
| 4,751,991 | 6/1988 | Naudin | 192/70.27 X |
| 4,811,474 | 3/1989 | Maucher et al. | 192/89 B X |
| 4,846,330 | 7/1989 | Takeuchi | 192/113 A |
| 4,947,973 | 8/1990 | Takeuchi | 192/113 A X |

FOREIGN PATENT DOCUMENTS

| | | |
|---|---|---|
| 0272329 | 6/1988 | European Pat. Off. |
| 3307943 | 9/1984 | Fed. Rep. of Germany ... 192/113 A |
| 2242892 | 3/1975 | France . |
| 2407393 | 5/1979 | France . |
| 2560950 | 9/1985 | France . |
| 2597559 | 10/1987 | France . |
| 278322 | 12/1987 | Japan ...................... 192/113 B |
| 1187365 | 4/1970 | United Kingdom . |
| 8802825 | 4/1988 | World Int. Prop. O. ...... 192/113 A |

*Primary Examiner*—Rodney H. Bonck
*Assistant Examiner*—Andrea Pitts
*Attorney, Agent, or Firm*—Longacre & White

[57] ABSTRACT

A diaphragm clutch mechanism comprises a cover provided on its internal periphery with fixing lugs for the diaphragm and retaining lugs disposed opposite holes in the diaphragm. The retaining lugs are at least partially bent to form flanges which extend towards the outside of the cover such that during rotation of the assembly, the flanges act as vanes which draw cooling air through the holes in the diaphragm and into the space inside the cover. The invention is particularly applicable to a clutch mechanism for a motor vehicle.

4 Claims, 3 Drawing Sheets

(PRIOR ART)

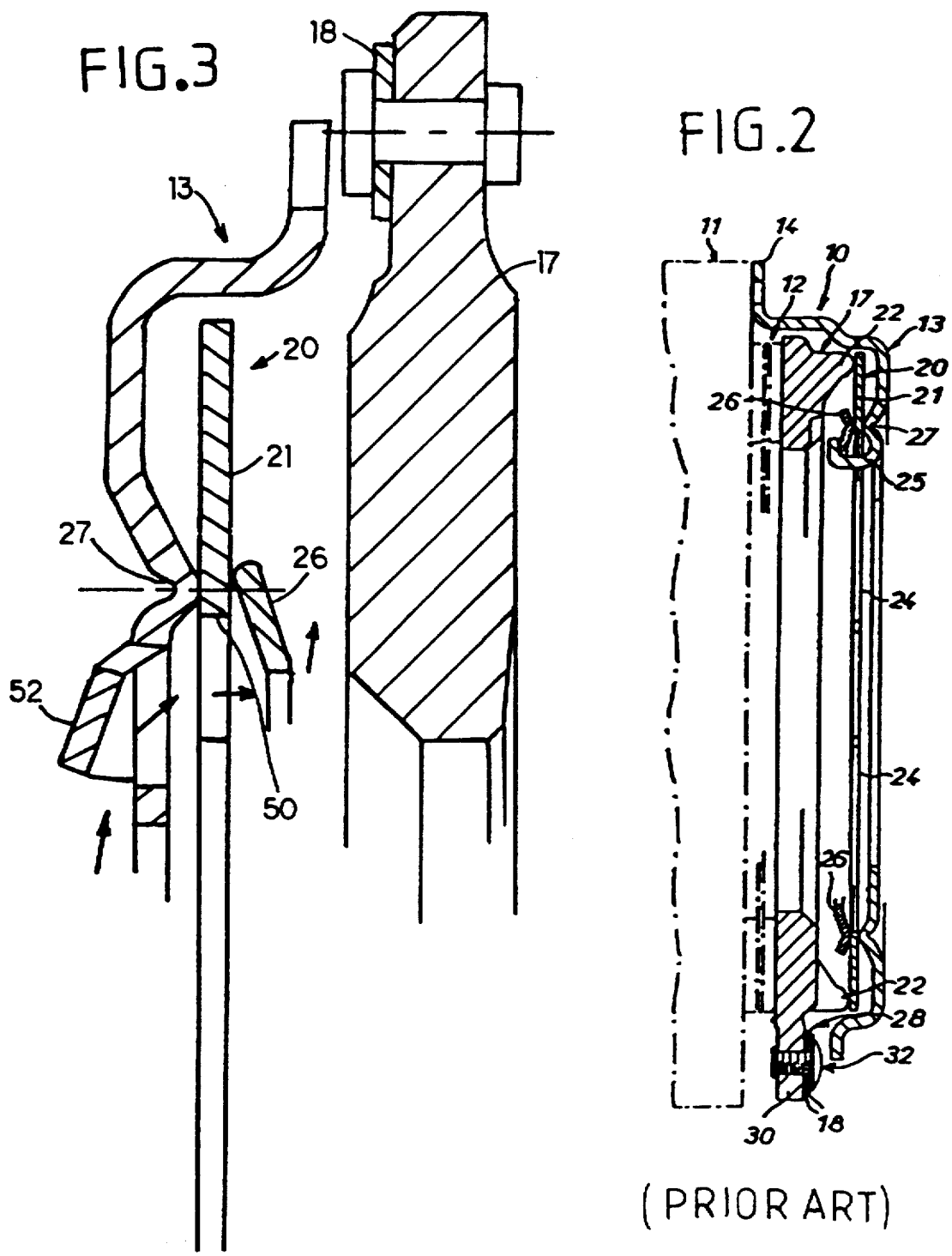

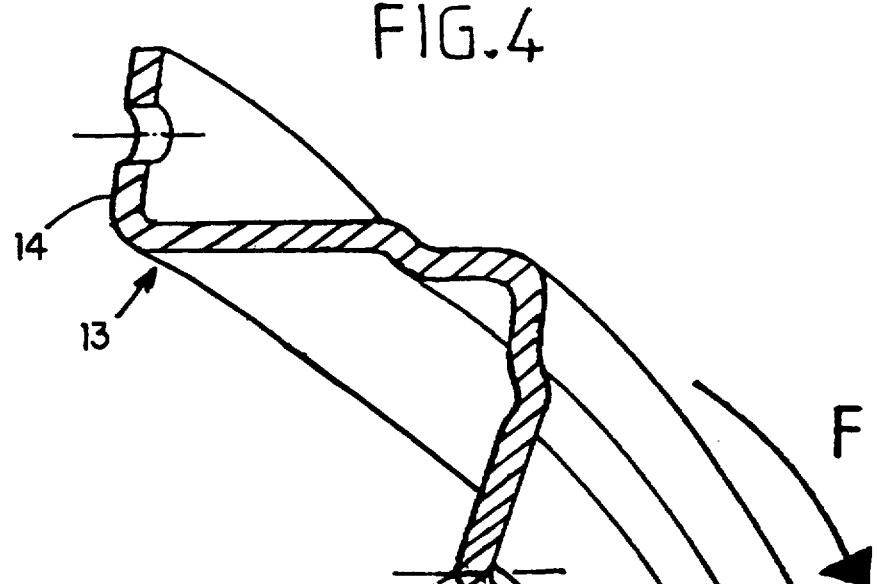
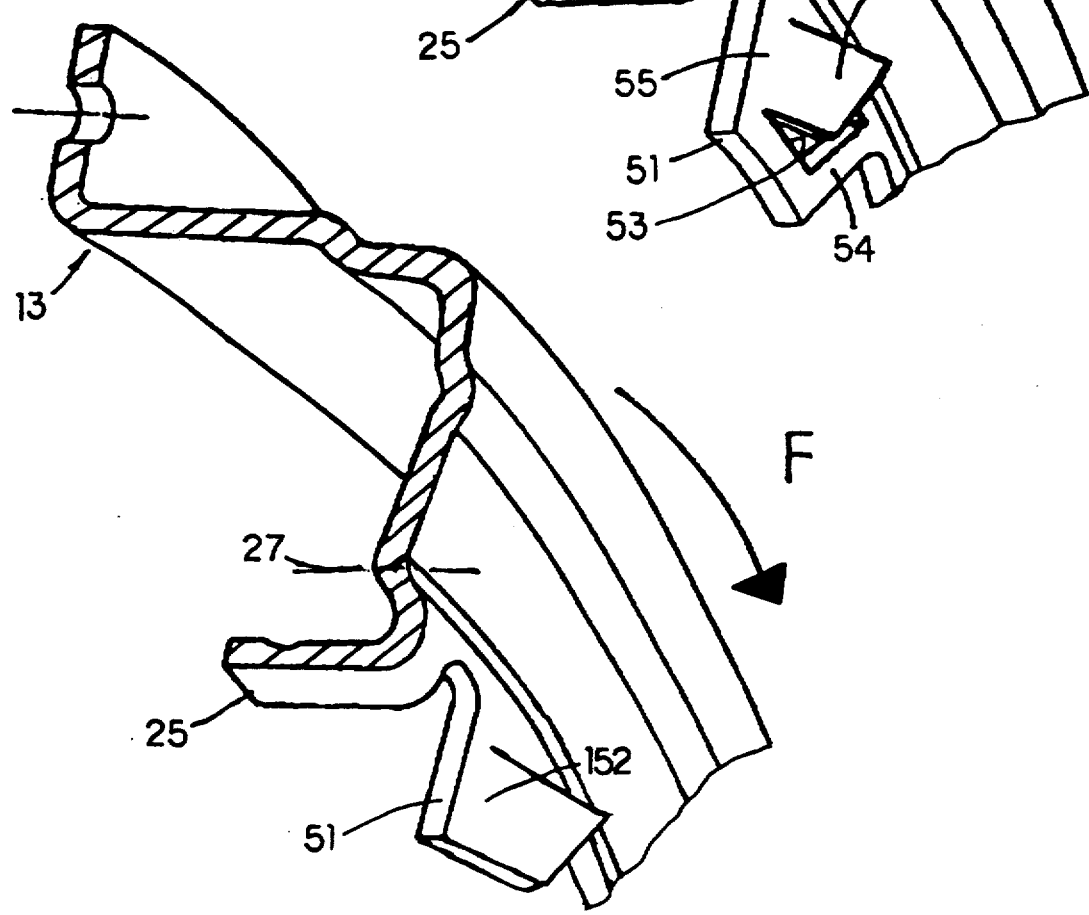

CLUTCH MECHANISM, ESPECIALLY FOR AN AUTOMOBILE VEHICLE

FIELD OF THE INVENTION

The present invention relates to clutch mechanisms of the kind comprising a diaphragm, in particular for automobile vehicles.

BACKGROUND OF THE INVENTION

A known clutch mechanism is shown in FIG. 1. This forms a unitary assembly and comprises at least one pressure plate 17, a cover 13 and a resilient diaphragm 20 having an axial action disposed between the cover and the pressure plate.

The cover 13 is adapted to be fastened to the reaction plate 11 of a clutch fixed to the driving shaft of the vehicle, whilst the pressure plate 17 is axially movable relative to the cover and is fixed in rotation with the latter.

The diaphragm 20 bears on the cover 13 and on the pressure plate 17 to urge the said plate towards the reaction plate 11 and to clamp, between the said plates 11 and 17, friction linings of a torsion damper 12 connected in rotation with the input shaft of the gearbox.

The diaphragm 20 comprises a peripheral part forming a "Belleville" washer 21, and a central part divided into radial fingers 24 by slots which open out into wider holes 50 disposed on the internal periphery of the "Belleville" washer part of the diaphragm.

In operation, especially when the clutch is engaged, heat is produced as a result of the friction between the plates 11, 17 and the linings of the torsion damper 12.

This heat may result in instability in the transmission of torque and is detrimental to the life of the friction linings.

In order to overcome this disadvantage, a device comprising a plurality of cooling flanges disposed at the internal periphery of the cover has been proposed in FR-A-2 560 950 (U.S. Pat. No. 4,657,128), the said flanges being inclined towards the interior of the cover.

This arrangement is not completely satisfactory, since the flanges are disposed facing the fingers of the diaphragm.

DISCUSSION OF THE INVENTION

It is an object of the present invention to overcome this disadvantage by improving the ventilation of the clutch mechanism whilst obtaining other advantages.

In accordance with the invention a clutch mechanism of the kind described above, in which the cover comprises generally radial retaining lugs on its internal periphery alternating circumferentially with fixing lugs and disposed opposite holes in the diaphragm, is characterized in that the retaining lugs are at least partially bent to form flanges which project towards the outside of the over to take in fresh air in such a way that the air can be directed by the flanges into the space inside the cover through the holes in the diaphragm.

As a result of the invention, additional use is made of the retaining lugs, as well as of their geometric location facing the holes in the diaphragm.

It will be under stood that this arrangement requires few tooling modifications and does not affect the strength of the cover, in contrast with the arrangement described in FR-A-2597559 (U.S. Pat. No. 4,846,330).

Advantageously, the flanges are produced by cutting and bending.

Furthermore, the modification of the invention does not alter the geometrical quality of the primary bearing provided on the diaphragm by the cover, in contrast to the twist obtained with the mechanism described in FR-A-2560950 (U.S. Pat. No. 4,657,128).

Further features and advantages of the invention will appear more clearly from the description which follows, which is given by way of example only, and with reference to the accompanying drawings.

BRIEF DESCRIPTION OF THE DRAWINGS

FIG. 2 is a view in axial cross-section taken along the line III—III in FIG. 1.

FIG. 3 is a partial view in axial cross-section, similar to FIG. 2, of a clutch mechanism provided with flanges in accordance with the invention.

FIG. 4 is a partial perspective view of the cover shown in FIG. 3 before bending the fixing lugs.

FIG. 5 is a similar view of FIG. 4 but of a second embodiment.

Figure 1:
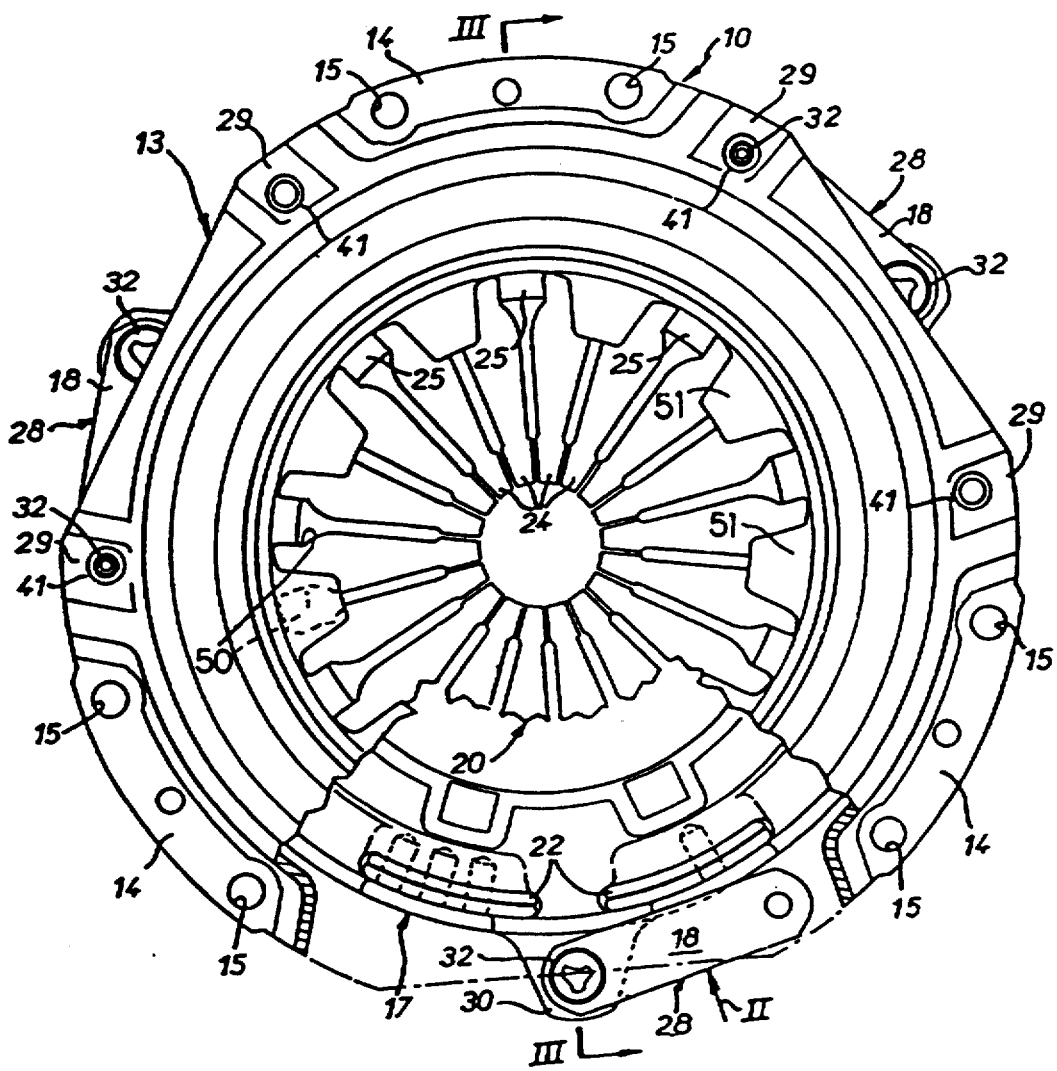
FIG. 1 is a view in elevation, with localized parts cut away, of the clutch mechanism identical to that shown in FIG. 1 of FR-A-2 407 393.

In the Figures a clutch mechanism can be seen, with the overall reference 10, such as is described herein above and in patent FR-A-2 407 393, the content of which is considered to be incorporated into the present description.

In this case, the pressure plate 17 is connected in rotation to the cover 13 by the intermediary of tangential tongues 18, the cover 13 and the plate 17 having an annular shape like the diaphragm 20.

These tongues are superposed in pairs in groups 28 which extend generally perpendicularly to a radial direction of the assembly and which are fixed, at one of their ends, to the cover 13 by means of flat regions of the cover which are off-set axially relative to radial flat regions 14 by which the cover 13 is adapted to be fixed by bolts to the reaction plate 11. At their other end the tongues 18 are fixed to radial lugs 30 of the pressure plate 17.

The diaphragm 20 is mounted so that it can tilt on the cover 13 and bears on subdivided bosses 22 projecting axially from the pressure plate 17.

The tiltable mounting of the diaphragm is provided by fixing lugs 25 integral with the cover, in this case stamped out from the sheet metal, disposed on the interval periphery of the cover, and a bearing washer 26 interposed between the ends of these lugs (which are then bent at right angles) and the diaphragm. The diaphragm 20 also bears on the cover 13 by means of a rib 27 stamped on the cover for this purpose.

The lugs 25, the washer 26 and the rib 27 thus form the tilting means fixing the diaphragm 20 to the cover 13 in a pivotable manner.

The lugs 25 extend axially and pass through the holes 50 in the diaphragm from which slots originate which separate the fingers 24 in pairs. These lugs 25 alternate circumferentially with retaining lugs 51 which are wider circumferentially than the lugs 25 and are disposed facing the holes 50 in the diaphragm (FIG. 1).

The lugs 51 are thus disposed on the interval periphery of the cover 13 and are internal with the cover 13. They extend generally radially. The lugs 51 limit, before the mechanism 10 is mounted on the plate 11, the expansion of the diaphragm, the fingers 24 of the latter then coming to bear against the said lugs.

The lugs 51, which just like the lugs 25 extend radially below the rib 27, have a trapezoidal shape, partially overlapping two successive fingers 24. It will be remembered that a clutch release bearing acts by pushing on the end of the fingers 24 in order to tilt the diaphragm 20 and interrupt its action on the plate 17.

In accordance with the invention the retaining lugs 51 are at least partially bent to form flanges 52 which project towards the outside of the cover 13 to draw in fresh air in such a way that the air can be directed by the flanges into the space inside the cover through the holes 50 in the diaphragm.

In FIGS. 3 and 4 the retaining lug 51 is partially bent outwards away from the plate 17. A localized flange 52 is formed circumferentially by cutting the lug 51 and bending to form an opening 53. The flanges 52 constitute a louvered shutter.

It will be noted that a thin band of material 54 is present at the leading edge of the lug 51, whilst the flange 52 is connected to the trailing edge of the lug by a region 55 form which it stems.

In FIG. 4 the direction of rotation of the cover when mounted is shown by the arrow F, and it can be seen that in operation the flanges 52 will force fresh air to circulate through the holes in the diaphragm (FIG. 3) and then between the diaphragm and the pressure plate 17, the discontinuous bosses 22 (see FIG. 1) allowing air to pass out of the assembly.

It will be appreciated that the use of retaining lugs 51 is carefully chosen since these are disposed facing holes 50, having a substantially rectangular shape, in the diaphragm so that this does not constitute a masking shield. Moreover the lug 51 is sturdy and extends over the entire height of the hole 50 and is wider circumferentially than the hole.

It will be noted that in this case the bearing washer 26 consists of a simple washer for the formation of a secondary bearing for the diaphragm facing the rib 27 which forms the primary bearing for the diaphragm 20, and also that the washer 26 extends for the most part radially beyond the flanges 52.

In FIG. 5 it is the major part of the respective retaining lug 51 which is cut and bent outwards in order to form a flange 152.

Taking into account the direction of rotation shown by the arrow F, it will be noted that the trailing edge of the lug 51 remains intact whilst the leading edge is raised, flanges 152 being attached to the cover 13 only along the trailing edge.

It will be appreciated that in all cases the bead 27 is not affected, that the lugs 51 ca continue to play their retaining role to limit the expansion of the diaphragm, and that the arrangement in accordance with the invention requires few modifications in tooling. Furthermore, the flanges do not extend into the interior of the cover and do not interfere with the tilting action of the diaphragm.

In addition, the strength of the cover, in the sense that it forms a hollow plate comprising fixing regions 14 at its external periphery and a base with a central opening, is not unduly decreased; in fact the substantially transverse wall which joins the rib 27 to the peripheral skirt of the cover is not weakened by any openings at all.

The present invention is not limited to the embodiments described, and in particular, instead of a bearing washer, a retaining ring may be provided, or the lug 25 may be shaped in order to form a bearing, as described in patent FR-A-2 242 892, the important factor being the localization of the retaining lugs opposite the holes in the diaphragm.

The primary bearing of the diaphragm may be a retaining ring; furthermore the mechanism may comprise several pressure plates and the connection between the pressure plate 17 and the cover may be of the mortise and tenon type.

The cover may be fixed by means of raised blocks attached to the cover or by axial struts extending from the cover.

What is claimed is:

1. A clutch mechanism, especially for an automobile vehicle, of the kind comprising a cover, a pressure plate which is fixed in rotation with the cover and is axially movable relative thereto, a diaphragm comprising a radially outer peripheral part forming a "Belleville" washer acting on said pressure plate, and a central part comprising radial fingers separated in pairs by slots originating in holes formed radially intermediate said peripheral part and said central part of the diaphragm; and tilting means fixing said diaphragm for pivoting relative to said cover, said tilting means including fixing lugs integral with said cover at a radially internal periphery thereof and passing through said holes in said diaphragm; and generally radial extending retaining lugs integral with the radially internal periphery of the cover to limit expansion of the diaphragm by bearing on the fingers thereof; said retaining lugs alternating circumferentially with said fixing lugs and being disposed facing said holes in the diaphragm; wherein the retaining lugs are at least partially bent to form flanges which project towards the outside of the cover to draw in fresh air in such a way that the air is directed by the flanges inside the cover through the holes in the diaphragm during rotation of the mechanism.

2. A clutch mechanism according to claim 1, wherein the flanges comprise integral protrusions of the retaining lugs.

3. A clutch mechanism according to claim 2, wherein each of the flanges protrude from and are integral with the retaining lugs at a verge of an opening through the retaining lug.

4. A clutch mechanism according to claim 2, wherein each of the flanges protrude from and are integral with the retaining lugs at a trailing edge thereof, whereby said trailing edge is determined with respect to the direction of rotation of said mechanism.

* * * * *